United States Patent
Dix et al.

(10) Patent No.: US 8,224,540 B2
(45) Date of Patent: Jul. 17, 2012

(54) APPARATUS AND METHOD FOR INCHING USING A CONTINUOUSLY VARIABLE TRANSMISSION

(75) Inventors: Peter John Dix, Naperville, IL (US); Garth H. Bulgrien, Ephrata, PA (US); Brian A. Hartman, Willowbrook, IL (US)

(73) Assignee: CNH America LLC

( * ) Notice: Subject to any disclaimer, the term of this patent is extended or adjusted under 35 U.S.C. 154(b) by 395 days.

(21) Appl. No.: 12/637,247

(22) Filed: Dec. 14, 2009

(65) Prior Publication Data
US 2011/0144869 A1     Jun. 16, 2011

(51) Int. Cl.
*G06F 7/00* (2006.01)

(52) U.S. Cl. ............. 701/56; 701/54; 701/95; 192/3.58; 475/80

(58) Field of Classification Search .............. 701/56, 701/54, 95, 50, 51, 55; 192/3.58, 13 R, 3.54; 475/80
See application file for complete search history.

(56) References Cited

U.S. PATENT DOCUMENTS

| | | | |
|---|---|---|---|
| 2,883,015 A * | 4/1959 | Schroeder | 192/221 |
| 4,760,797 A * | 8/1988 | Stubbs et al. | 104/12 |
| 5,050,456 A | 9/1991 | Fukuda | |
| 5,101,943 A | 4/1992 | Bulgrien | |
| 5,217,097 A * | 6/1993 | Lasoen | 192/3.58 |
| 6,250,077 B1 * | 6/2001 | Iino et al. | 60/436 |
| 6,269,295 B1 | 7/2001 | Gaugush et al. | |
| 6,598,886 B2 | 7/2003 | Baird et al. | |
| 6,606,844 B2 | 8/2003 | Dillon et al. | |
| 6,647,332 B1 | 11/2003 | Esterby et al. | |
| 6,718,244 B2 * | 4/2004 | Lin et al. | 701/50 |
| 7,063,638 B2 | 6/2006 | Weeramantry | |
| 7,165,662 B2 * | 1/2007 | Kuhner et al. | 192/13 R |
| 2008/0115993 A1 * | 5/2008 | Roudeau et al. | 180/179 |
| 2010/0023228 A1 * | 1/2010 | Montgomery | 701/50 |
| 2011/0144869 A1 * | 6/2011 | Dix et al. | 701/50 |

FOREIGN PATENT DOCUMENTS

JP     59062754 A     4/1984

OTHER PUBLICATIONS

Abstract of RD-528009 (Apr. 10, 2008), 1 page from Derwent International Information Ltd. *Tractor Button Control Forward Reverse Inching Function Respective User Interface Unit Locate CAB Activate Normal Gear Lever Left Predetermined Position.*

* cited by examiner

*Primary Examiner* — Paul N Dickson
*Assistant Examiner* — Karen A Beck
(74) *Attorney, Agent, or Firm* — Sue C. Watson; Patrick Sheldrake

(57) ABSTRACT

An agricultural vehicle and method of operating the same, where the agricultural vehicle has an engine, a continuously variable transmission, a processor, an inching controller, and a speed controller. The speed controller sends a first signal to the processor, and the processor controls the transmission to operate the vehicle at a first speed based on the first signal. The inching controller sends a second signal to the processor, and the processor controls the transmission to move the agricultural vehicle in a forward or reverse direction, depending on the second signal. If the first speed based on the first signal is zero, the second signal triggers the processor to control the transmission to move the agricultural vehicle in the forward or reverse direction a predetermined first distance. The control of the vehicle to be at zero speed or to be in a particular position is effectuated by a position control mechanism.

28 Claims, 3 Drawing Sheets

APPARATUS AND METHOD FOR INCHING USING A CONTINUOUSLY VARIABLE TRANSMISSION

BACKGROUND OF THE INVENTION

Agricultural vehicles often times have hitches that can be used to tow implements or trailers. These hitches may be of the drawbar type or three-point type. Often times, attaching these implements to a vehicle may be tedious, since it requires positioning the vehicle quite accurately, and making small adjustments to the position, perhaps as small as several millimeters.

A new type of transmission is available on many agricultural tractors, typically termed a "continuously variable transmission" or CVT. This type of transmission differs from other transmissions in that there is a continuous range of gear ratios available, rather than a discrete number of fixed ratios. Often times, the operator commands the direction of the travel and the ground speed, and the speed is regulated electronically. In order to control the true ground speed, the tire size must be known and is often entered by the operator or technician. If this is not desired, the axle speed may be regulated, or alternatively, the gear ratio may be set by the operator. Some agricultural vehicles, such as tractors, may have automatic features to control the engine speed and optimize various parameters. Vehicles with CVTs often include a feature that controls the speed of the vehicle to be zero. However, control loops used to maintain the velocity to zero will have some error and cause slow drift. This control of velocity can be effectuated by a pedal on the floor and/or a handle within reach of the operator of the tractor.

One example of a CVT transmission is the four range, common input, inline pump/motor transmission described in U.S. Pat. No. 7,063,638, whose disclosure is incorporated by reference herein in its entirety. Such a transmission uses a variable hydraulic pump and motor to achieve continuous variation of the gear ratio.

In order to control the speed, it is conventionally known to have a transmission, such as a powershift transmission or a CVT transmission, operably connected to an inching pedal. These inching pedals are utilized for making small adjustments to the speed of the agricultural vehicles by depressing the inching pedal to slow down or stop the vehicle. When the inching pedal is depressed, this releases the pressure in a clutch in the transmission, which results in slippage of the clutch and less torque being transferred through the transmission. Such systems permit the use of the inching pedals with full engine speed available for lifting or other purposes. The direction of inching can be set by the direction that the transmission is commanded to operate in. For example, the direction of the transmission may be controlled by a lever with a forward, reverse, neutral and perhaps park positions, where the movement can be controlled to be in a forward direction, in a reverse direction, or neither if the vehicle is stopped. The forward and reverse positions of the lever can be selected for inching in the forward or reverse directions, respectively, and the inching pedal would be used to control the speed of the vehicle as the inching is performed.

While existing systems permit the provision of a gear ratio or ground speed for positioning the agricultural vehicle to attach an implement, there is a need for a vehicle where the operator can directly command a change in the position of the vehicle in order to provide more control of exactly where the vehicle will be. The present invention addresses this need, as explained below.

BRIEF SUMMARY OF THE INVENTION

In one aspect of the present invention, an agricultural vehicle comprises an engine, a continuously variable transmission operably connected to the engine, a processor operably connected to the continuously variable transmission, an inching controller operably connected to the processor, and a speed controller operably connected to the processor. The speed controller is configured to send a first signal to the processor, and the processor is configured to control the transmission to operate the vehicle at a first speed based on the first signal. The inching controller is configured to send a second signal to the processor, and the processor is configured to control the transmission to move the agricultural vehicle in a forward or reverse direction, depending on the second signal. The processor is configured such that if the first speed based on the first signal is zero, the second signal will trigger the processor to control the transmission to move the agricultural vehicle in the forward or reverse direction a predetermined first distance.

In a second aspect of the present invention, a method of operating the agricultural vehicle described above comprises sending the first signal from the speed controller to the processor and controlling the transmission to operate the vehicle at the first speed based on the first signal. The method also includes sending the second signal from the inching controller to the processor, and moving the agricultural vehicle in the forward or reverse direction, depending on the second signal. If the first speed based on the first signal is zero, the method includes moving the agricultural vehicle, based on the second signal, in the forward or reverse direction a predetermined first distance.

In a third aspect of the present invention, an agricultural vehicle comprises an engine, a continuously variable transmission operably connected to the engine, a processor operably connected to the continuously variable transmission, and a device for measuring the position of the vehicle operably connected to the processor. The processor is configured to determine a position setpoint, determine a current position of the vehicle based on information received from the device for measuring the position of the vehicle, and compare the position setpoint and the current position of the vehicle to obtain a position setpoint error indicative of the difference between the position setpoint and the current position of the vehicle. The processor is also configured to control the transmission to move the vehicle from the current position towards the position setpoint to reduce the position setpoint error.

In a fourth aspect of the present invention, a method of operating the agricultural vehicle described in the third aspect of the present invention comprises determining a position setpoint, determining a current position of the vehicle based on information received from the device for measuring the position of the vehicle, and comparing the position setpoint and the current position of the vehicle to obtain a position setpoint error indicative of the difference between the position setpoint and the current position of the vehicle. The method further comprises moving the vehicle from the current position towards the position setpoint to reduce the position setpoint error.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the Drawings.

DETAILED DESCRIPTION OF THE INVENTION

The present invention utilizes CVT technology to provide a different mode of operation that assists the operator in accurately positioning the vehicle to attach an implement. The term "continuously variable transmission" or CVT, is intended to encompass any transmission with continuously variable ratios, especially a transmission with infinitely variable ratios within a certain range that includes ratios which are positive, zero, and negative (to go forward, stop, or go in reverse). In the present invention, instead of commanding a gear ratio or ground speed, which would result in a change of position of the vehicle, the operator directly commands a change in the position of the vehicle. The commands to change the position of the vehicle would occur while the speed command to the transmission is zero. Moreover, the change in position would be with respect to the current position of the vehicle. This current vehicle position would be maintained if the change in position command were not given because of the zero speed command provided to the transmission, as explained more fully below.

Figure 1:
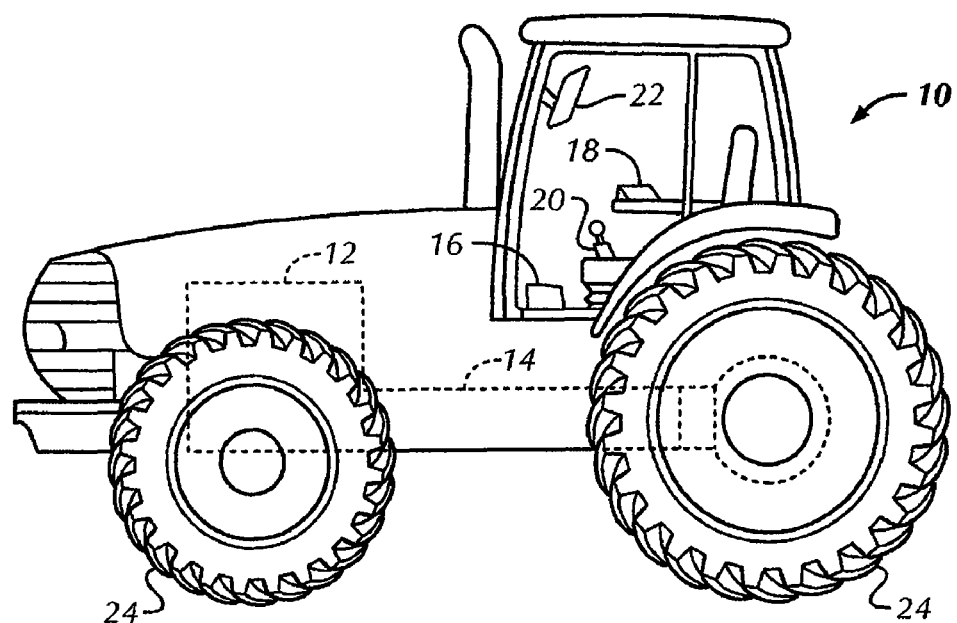
FIG. 1 shows an agricultural vehicle according to the present invention.
Figure 2:
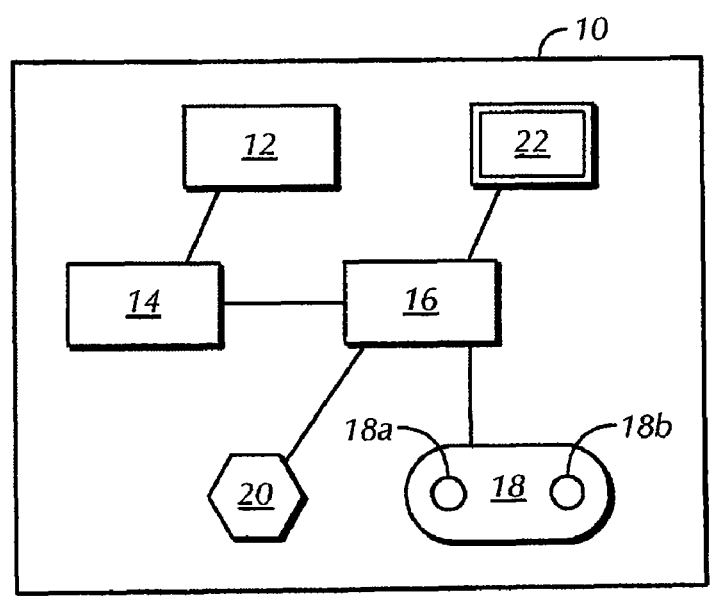
FIG. 2 is a block diagram representation of the agricultural vehicle according to FIG. 1.

Regarding FIGS. 1 and 2, an agricultural vehicle ("vehicle") 10 includes an engine 12, wheels 24, a continuously variable transmission ("CVT" or "transmission") 14 operably connected to the engine 12, a processor 16 operably connected to the continuously variable transmission 14, an inching controller 18 operably connected to the processor 16, a speed controller 20 operably connected to the processor 16, and a display 22 operably connected to the processor 16. In the present disclosure, the processor 16 can be unitary or can be separated into various portions which collectively have the features described herein. Thus, the portions of the processor 16 which are operably connected with the inching controller 18 and/or speed controller 20, may be physically separated from the remainder of the processor 16 and may be part of the inching controller 18 and/or speed controller 20.

The speed controller 20 is configured to send a first signal to the processor 16, and the processor 16 is configured to control the transmission 14 to operate the vehicle 10 at a first speed based on the first signal. Such speed controller 20 can be a pedal, lever, knob, keypad, or other device which the operator of the vehicle 10 can utilize to control the speed of the vehicle 10. The first speed can be zero, or more than zero. When the first speed is zero (i.e., the vehicle 10 is in "powered zero" mode), a position control mechanism ensures that the position of the vehicle 10 is properly maintained.

The inching controller 18 preferably has two functions. First, it is utilized to set the direction of movement of the vehicle 10 to forward or reverse, even if no inching is occurring. Second, it is utilized to effectuate the inching of the vehicle 10 in the forward or reverse directions.

If the vehicle 10 is not in powered zero mode, the inching controller 18 is utilized to set the direction of movement to forward or reverse. In this case, the inching controller 18 (e.g., buttons 18a, 18b) can change the direction of travel of the vehicle, and this direction is then maintained until changed once again. The inching controller 18 could be the primary means of commanding vehicle direction, or a secondary means. Thus, there may be a lever or other device to control whether the vehicle 10 moves in the forward or reverse direction, or the inching controller 18 may be the only device which controls such direction of motion.

The inching controller 18, when activated, sends a second signal to the processor 16, and the second signal provides information for the processor 16 to set the direction of motion in forward or reverse. Thus, depending on the second signal from the inching controller 18 to the processor 16, the processor 16 is configured to control the transmission 14 to move the agricultural vehicle 10 in a forward or reverse direction. Such control is available when the first speed based on the first signal is not zero, in which case the inching controller 18 is acting to change the direction of the vehicle 10 while driving.

If the vehicle 10 is in powered zero mode, activating the inching controller 18 could also change the commanded direction, such that when the speed command is changed to a non-zero speed, the transmission will engage in this direction. When in powered zero mode, this is done in combination with performing an inching function, as explained below.

When the vehicle 10 is in powered zero mode, the inching controller 18 is designed to be activated a single time, repeatedly, or continuously, and may comprise a lever, buttons, knobs, etc. Preferably, the inching controller 18 comprises first and second buttons 18a, 18b, which are, respectively, forward and reverse buttons. The processor 16 is configured to control the transmission 14 to move the agricultural vehicle 10 a predetermined first distance in the forward direction each time the first button 18a is depressed and in the reverse direction each time the second button 18b is depressed. The processor 16 is configured to set the predetermined first distance at a value based upon a user command, depending on whether the user desires a longer or shorter movement every time the inching controller 18 is activated. The processor 16 can also set the predetermined first distance to a default setting.

Figure 3:
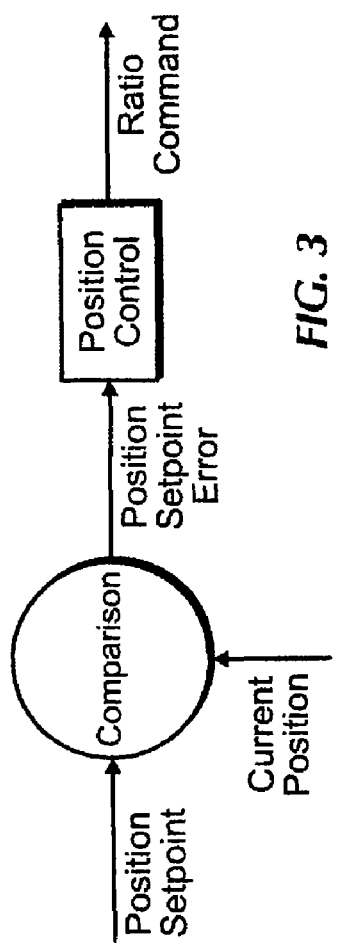
FIG. 3 is a block diagram showing position control according to the present invention.

FIG. 3 shows the position control of the present invention. Once the vehicle stops (i.e., the first speed based on the first signal is zero), a "position setpoint" is determined by the processor. Then, the processor 16 will, preferably, effectuate position control in order to ensure that the vehicle 10 is positioned at the position setpoint. Thus, if the position of the vehicle 10 were to change due to drift, a position control loop would move the vehicle 10 back towards the position setpoint. This is different from merely controlling speed to zero without position control, since a control of speed to zero will not correct the position of the vehicle if there is drift, since the speed would merely be controlled back to zero at the new position after drift. In the present invention, when the speed is controlled to zero, position control will automatically keep the vehicle 10 at the appropriate position.

The position control is effectuated by comparing the position setpoint with a current position of the vehicle to obtain a position setpoint error. The position setpoint error is preferably indicative of the difference between the position setpoint and the current position of the vehicle 10. Based on this position setpoint error, position control is effectuated to determine and send a ratio command to the transmission to move the vehicle 10 towards the first position setpoint to reduce the position setpoint error. Thus, a loop is created where the current position is measured intermittently or continuously and the current position is compared with the position setpoint to determine the position setpoint error. Thus, once a position setpoint is established, if the vehicle 10 is not at that position setpoint, the position setpoint error would not be zero and position control would be effectuated to reduce the position setpoint error by commanding the transmission 14 to move the vehicle 10 towards the position setpoint. If the vehicle 10 drifts for any reason, or overshoots or undershoots the position setpoint, then the position setpoint error would not be zero and position control would be effectuated to move the vehicle 10 towards the position setpoint to reduce the position setpoint error. Thus, the vehicle 10 is maintained at the position setpoint even if there is drift.

If the speed controller 20 is set to a number higher than zero (e.g., the vehicle is driven), then the position setpoint would be disregarded or erased. Once the speed controller 20 is set to zero and the vehicle 10 stops, the stopping position of the vehicle 10 would become the position setpoint. Additionally, in the case of inching, the "position setpoint" is modified by the inching controller 18, so that a new position setpoint is created to which the vehicle 10 will move based upon the loop described in FIG. 3. As the vehicle 10 reaches new position setpoints during inching, the position control would maintain the vehicle in those new position setpoints even if there is drift, since the control is to a particular position.

The "current position" (also referred to as the updated position) of the vehicle is determined by the processor 16. Preferably, the processor 16 will determine the current position of the agricultural vehicle 10 by measuring an angular displacement of an output shaft of the transmission 14 ("output shaft") compared to a standard. The position of the output shaft is an indication of the amount of "turning" that the wheels have been subjected to through the transmission 14. As the output shaft of the transmission 14 rotates, the wheels rotate, so a correlation between the angular position of the output shaft and the angular position of the wheels exists, which permits the determination of the position of the vehicle 10.

Rotary encoders, which are known in the art and are commercially available, can be utilized to determine the position of the output shaft. This, in turn, can be used to calculate the position of the vehicle 10 and the position information can be saved, continuously or intermittently, to a memory device such as a RAM device, an EEPROM device, a magnetic recording device, or a flash memory device for use with the position control of the vehicle 10. The position of the vehicle 10 can be determined by measuring the rotation of a variety of shafts in the transmission, not just the output shaft. One option for measuring angular displacement is sensing the rotation of the output or other shaft by a toothed wheel type sensor capable of sensing the direction of rotation. The sensing of the teeth can be done optically or magnetically, for example, and is well known in the art such that no further explanation is necessary herein. The relative position is determined by counting the edge of the teeth passing in one direction or the other. It is noted that this "position" is a relative position, not an absolute position, and is merely a reference point for use by the processor 16. Other ways to measure position are within the spirit and scope of the present invention, such as GPS systems, and the measurement of other mechanical parts of the vehicle 10 in addition to or in lieu of the output shaft.

Figure 4:
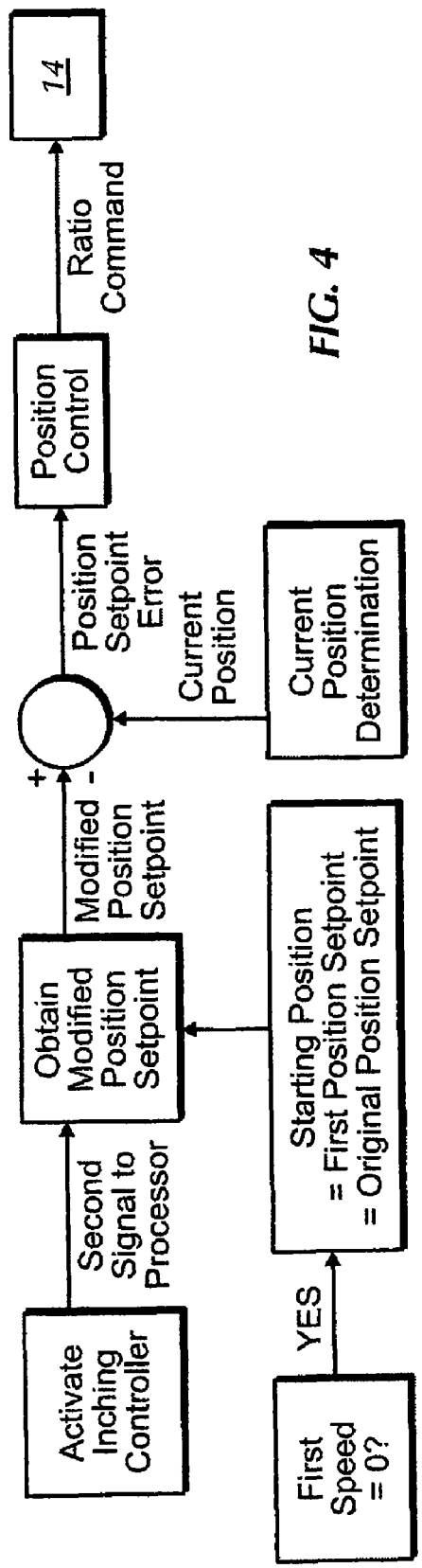
FIG. 4 is a flow diagram representation of inching according to the present invention.

FIG. 4 more specifically shows the present invention as utilized to effectuate inching. Here, the processor 16 is configured to determine whether the first speed based on the first signal is zero, and if it is zero, the processor 16 will set a starting position of the agricultural vehicle 10 as a first position set point and as an original position set point. The original position set point will remain unchanged until the first speed based on the first signal is more than zero. In terms of the position control diagram of FIG. 3, the "first position setpoint" would fall under the category of "position setpoint" since this is what will be compared with the current position of the vehicle 10.

The activation of the inching controller 18 causes the processor 16 to modify the first position set point to obtain a modified position setpoint upon receipt of the second signal after the setting of the first position setpoint. The modified position setpoint is determined by the first position setpoint, the predetermined first distance, and the second signal. The distance between the first position setpoint and the modified position setpoint is the predetermined first distance. The second signal provides information indicative of whether this modified position setpoint will be in the forward direction, or the reverse direction, relative to the first position setpoint. In terms of the position control diagram of FIG. 3, the "modified position setpoint" would fall under the category of "position setpoint" since this is what will be compared with the current position of the vehicle 10.

Once the first position setpoint and the modified position setpoint are set, the processor 16 determines a current position of the vehicle 10 and compares the current position of the vehicle 10 with the modified position setpoint to obtain a position set point error. This can be done by subtracting the current position from the modified position setpoint. Then, the transmission 14 is controlled, based on the position set point error, to move the agricultural vehicle to the modified position setpoint to make the position set point error zero. This can be done in a variety of ways. Preferably, the processor 16 is configured to control the transmission 14 to move the agricultural vehicle 10 to the modified position setpoint to make the position setpoint error zero by sending a ratio command to the transmission 14 which commands the transmission 14 to operate at a particular gear ratio for a particular time based on the ratio command. The position setpoint error is used by a position control algorithm to determine a ratio command to move the vehicle 10, as needed. The controlling of position may be effectuated with a PID (proportional-integral-derivative) type controller, and the control can be designed such that it always drives the position set point error to zero. A HD controller and the algorithms associated therewith are well known in the art and no further explanation of these is needed.

Figure 5:
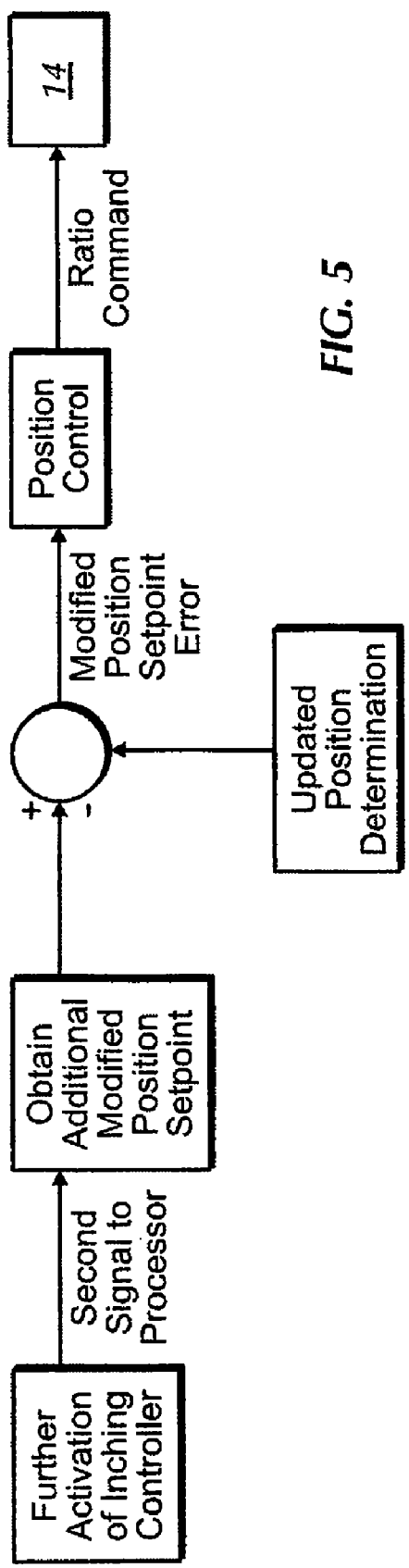
FIG. 5 is a flow diagram representation of further inching according to the present invention.

As stated above, and referring to FIG. 5, the inching controller 18 can be activated a plurality of times, not just one time. In such a situation, after the inching controller 18 is activated once, further activations will cause the processor 16 to modify the modified position setpoint to obtain respective consecutive additional modified position setpoints, upon receipt of additional second signals from the inching controller 18. The additional modified position setpoints have positions determined by the first position setpoint, the predetermined first distance, the second signal, and the additional second signals. Basically, the first position setpoint is the initial reference point for determining additional modified position setpoints. The second signal and the additional second signals, in the aggregate, provide information regarding a desired position relative to the first position setpoint, in the forward or reverse directions, in units of the predetermined first distance.

The determination of the additional modified position setpoints will trigger the movement of the vehicle 10 to perform inching operations. The processor 16 is configured to compare an updated position of the agricultural vehicle with a last of the additional modified position setpoints each time an additional second signal is received by the processor 16 from the inching controller 18 to obtain a modified position set point error. Such comparison can be the subtraction of the updated position from the modified position set point. It is noted that the updated position of the vehicle 10 is merely another determination of the current position of the vehicle 10, which would be an updated position since the vehicle 10 may have moved since the previous time the current position was determined. Then, the processor 16 controls the transmission 14, based on the modified position setpoint error, to move the agricultural vehicle 10 to the last of the additional modified position setpoints to make the modified position set point error zero. The position control procedure involving the modified position setpoint error is preferably the same as that involving the position setpoint error, which results in a ratio command being sent to the transmission 14, as described above.

As stated above, the inching controller 18 can be activated continuously. For example, if the inching controller 18 consists of buttons 18a, 18b, the depression of one of the buttons 18a, 18b continuously (i.e., more than just momentarily), will cause the vehicle 10 to move at a predetermined slow speed in the forward or reverse directions, depending on which button is depressed. The processor 16 is configured to determine whether the inching controller 18 is being continuously activated, and is configured to control the transmission 14 to move the agricultural vehicle 10 in the forward or reverse directions, depending on whether the second signal indicates a reverse or forward activation of the inching controller 18, at a predetermined second speed (the slow speed) during a continuous activation of the inching controller 18. Thus, if one of buttons 18a, 18b is depressed continuously, rather than inching just once or repeatedly, the vehicle 10 will move at a slow but continuous speed which can be set by the operator or it can be a default setting. Upon release (i.e., deactivation) of the inching controller 18 after continuous activation, the processor 16 will control the vehicle 10 to stop at the position of the vehicle 10 when the inching controller 18 was released, and the position setpoint will be set to be equal to this position.

The determination of the current (or updated) position of the vehicle 10 is preferably done by the processor 16. Preferably, the processor 16 will determine the current position of the agricultural vehicle 10 by measuring an angular displacement of the output shaft of the transmission 14 ("output shaft"). The position of the output shaft is an indication of the amount of "turning" that is sent to the wheels through the transmission 14, as explained above. The ways to measure the position of the vehicle 10 are explained more fully above.

Figure 6:
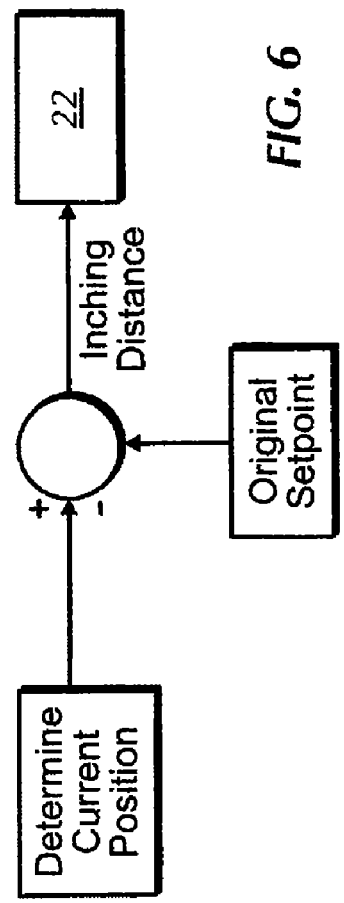
FIG. 6 is a flow diagram representation of a determination and display of inching distance according to the present invention.

As stated above and in reference to FIG. 6, there is a determination of an original set point which does not vary until the first speed is more than zero, and this original setpoint is utilized to determine the inching distance traveled and this distance is communicated to the operator through the display 22. The processor 16 is configured to command the display 22 to display information based upon a relationship between the current (or updated) position of the vehicle 10, and the original set point. In particular, the display 22 would indicate how far the vehicle has moved forward or backwards from the original set point. This can be determined by subtracting the original setpoint from the current position of the vehicle 10, and would provide the total inching distance, which would be reset when the speed command is changed from zero. The inching distance may be displayed in a multipurpose display, and perhaps automatically appear if the operator initiates inching, and disappear when the speed command is changed from zero. The display of the inching distance could be particularly useful if the operator must leave the seat of the vehicle 10 to check the distance to the implement, where he can measure or estimate the distance, and then look at the display 22 while pushing the button 18a, 18b repeatedly to move the desired distance. The display of the inching distance can be done before (i.e., zero inching distance), during, or after inching takes place, and can be displayed continuously during an inching operation in real-time.

EXAMPLE 1

Situation: The predetermined first distance is set to ten millimeters. The first speed of the vehicle is zero ("powered zero" mode).

A) The starting position of the vehicle is set as the first position set point and as the original position set point.

B) The inching controller is continuously activated in the reverse direction (e.g., an inching button is pressed and held down). The predetermined second speed is 0.1 miles per hour.

C) The inching controller is released after 10 seconds and the vehicle stops moving after advancing 446.9 millimeters in the reverse direction.

D) The current position of the vehicle is set as the first position setpoint.

E) The inching controller is activated one time in the reverse direction, and the inching controller sends a second signal to the processor indicative of the fact that the inching controller was activated one time in the reverse direction.

F) The processor modifies the first position setpoint (446.9 millimeters in the reverse direction) to a modified position setpoint of 456.9 millimeters in the reverse direction.

G) The processor determines the current position of the vehicle to be 446.9 millimeters in the reverse direction, and compares it to the modified position setpoint of 456.9 millimeters in the reverse direction, to provide a position set point error, which is 10 millimeters in reverse (modified position setpoint—current position).

H) The transmission is controlled to move the agricultural vehicle to the modified position setpoint to make the position setpoint error zero.

I) The inching controller is activated one more time in the reverse direction, and the inching controller sends a second signal to the processor indicative of the fact that the inching controller was activated one more time in the reverse direction.

J) The modified position setpoint is modified ten millimeters in the reverse direction to obtain an additional modified position setpoint.

K) The processor determines the current (updated) position of the vehicle (which is the same as the modified position setpoint), and compares it to the additional modified position setpoint to provide a modified position set point error, which is ten millimeters in reverse (additional modified position setpoint—current position).

L) The transmission is controlled to move the agricultural vehicle to the additional modified position setpoint to make the modified position setpoint zero.

Note: The procedures in steps I)-L) can be repeated over and over, resulting in repeated inching in the forward and/or reverse directions.

M) The display shows the position of the vehicle relative to the original position setpoint, which is 466.9 millimeters in the reverse direction.

Note: Step M) can be carried out at any time after step A). For example, the display can show the position of the vehicle relative to the original position setpoint continuously or intermittently.

EXAMPLE 2

Situation: The speed command to the vehicle is not a zero speed command (i.e., no "powered zero" mode). The vehicle is moving at 10 miles per hour in the forward direction.

A) The inching controller is activated in the reverse direction, and the vehicle 10 changes direction and moves in the reverse direction at 10 miles per hour.

B) The inching controller is activated in the forward direction, and the vehicle 10 changes direction again and moves in the forward direction at 10 miles per hour.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An agricultural vehicle, comprising:
   an engine;
   a continuously variable transmission operably connected to the engine;
   a processor operably connected to the continuously variable transmission;
   an inching controller operably connected to the processor; and
   a speed controller operably connected to the processor;
   wherein the speed controller is configured to send a first signal to the processor, and the processor is configured to control the transmission to operate the vehicle at a first speed based on the first signal,
   wherein the inching controller is configured to send a second signal to the processor, and the processor is configured to control the transmission to move the agricultural vehicle in a forward or reverse direction, depending on the second signal, and
   wherein the processor is configured such that if the first speed based on the first signal is zero, the second signal will trigger the processor to control the transmission to move the agricultural vehicle in the forward or reverse direction a predetermined first distance.

2. The agricultural vehicle according to claim 1, wherein the processor is further configured to:
   determine whether the first speed based on the first signal is zero, and if the first speed based on the first signal is zero, set a starting position of the agricultural vehicle as a first position set point,
   modify the first position set point to obtain a modified position setpoint upon receipt of the second signal after the setting of the first position setpoint, the modified position setpoint having a position determined by the first position setpoint, the predetermined first distance, and the second signal,
   determine a current position of the agricultural vehicle and compare the current position of the agricultural vehicle with the modified position setpoint to obtain a position set point error, and
   control the transmission, based on the position set point error, to move the agricultural vehicle to the modified position setpoint to make the position set point error zero.

3. The agricultural vehicle according to claim 2, wherein the processor is further configured to control the transmission to move the agricultural vehicle to the modified position setpoint to make the set point error zero by sending a ratio command to the transmission which commands the transmission to operate at a particular gear ratio for a particular time based on the ratio command.

4. The agricultural vehicle according to claim 2, wherein the processor is further configured to determine the current position of the agricultural vehicle by measuring an angular displacement of an output shaft of the transmission.

5. The agricultural vehicle according to claim 1, wherein the inching controller comprises a first button and a second button, and the processor is configured to control the transmission to move the agricultural vehicle the predetermined first distance in the forward direction each time the first button is depressed and in the reverse direction each time the second button is depressed.

6. The agricultural vehicle according to claim 1, wherein the processor is further configured such that if the first speed based on the first signal is not zero, the processor will control the transmission to move the agricultural vehicle in the forward or reverse direction based upon the second signal.

7. The agricultural vehicle according to claim 1, wherein the processor is further configured to set the predetermined first distance at a value based upon a user command.

8. The agricultural vehicle according to claim 1, further comprising a display operably connected to the processor, wherein the processor is further configured to:
   determine whether the first speed based on the first signal is zero, and if the first speed of the first signal is zero, set a starting position of the agricultural vehicle as a first position set point and as an original position set point, the original position set point remaining unchanged until the first speed based on the first signal is more than zero,
   modify the first position set point to obtain a modified position setpoint upon receipt of a second signal after the setting of the first position setpoint, the modified position setpoint having a position determined by the first position setpoint, the predetermined first distance, and the second signal,
   determine a current position of the agricultural vehicle and compare the current position of the agricultural vehicle with the modified position setpoint to obtain a position set point error,
   control the transmission, based on the position set point error, to move the agricultural vehicle to the modified position setpoint to make the set point error zero, and
   display information on the display based upon a relationship between the position of the agricultural vehicle and the original set point.

9. The agricultural vehicle according to claim 1, wherein the processor is further configured to determine whether the inching controller is being continuously activated, and is configured to control the transmission to move the agricultural vehicle in the forward or reverse directions at a predetermined second speed during a continuous activation of the inching controller.

10. The agricultural vehicle according to claim 2, wherein the processor is further configured to:
    modify the modified position setpoint to consecutively obtain respective consecutive additional modified position setpoints, upon receipt of additional second signals from the inching controller, the consecutive additional modified position setpoints having positions determined by the first position setpoint, the predetermined first distance, the second signal, and the additional second signals, compare an updated position of the agricultural vehicle with a last of the additional modified position setpoints each time an additional second signal is received by the processor from the inching controller, to obtain a modified position set point error, and control the transmission, based on the modified position setpoint error, to move the agricultural vehicle to the last of the additional modified position setpoints to make the modified position set point error zero.

11. The agricultural vehicle according to claim 8, wherein the processor is further configured to:

modify the modified position setpoint to consecutively obtain respective consecutive additional modified position setpoints, upon receipt of additional second signals from the inching controller, the additional modified position setpoints having positions determined by the first position setpoint, the predetermined first distance, the second signal, and the additional second signals, compare an updated position of the agricultural vehicle with a last of the additional modified position setpoints each time an additional second signal is received by the processor from the inching controller to obtain a modified position set point error, and control the transmission, based on the modified position setpoint error, to move the agricultural vehicle to the last of the modified position setpoints to make the modified position set point error zero.

12. A method of operating the agricultural vehicle according to claim 1, comprising:

sending a first signal from the speed controller to the processor;

controlling the transmission to operate the vehicle at a first speed based on the first signal;

sending a second signal from the inching controller to the processor;

moving the agricultural vehicle in the forward or reverse direction, depending on the second signal, and if the first speed based on the first signal is zero, moving the agricultural vehicle, based on the second signal, in the forward or reverse direction a predetermined first distance.

13. The method according to claim 12, further comprising:

determining whether the first speed based on the first signal is zero, and if the first speed based on the first signal is zero, setting a starting position of the agricultural vehicle as a first position set point, modifying the first position set point to obtain a modified position setpoint upon receipt of the second signal by the processor after the setting of the first position setpoint, the modified position setpoint having a position determined by the first position setpoint, the predetermined first distance, and the second signal, determining a current position of the agricultural vehicle and comparing the current position of the agricultural vehicle with the modified position setpoint to obtain a position set point error, and moving the agricultural vehicle to the modified position setpoint to make the position set point error zero.

14. The method according to claim 13, wherein moving the agricultural vehicle to the modified position setpoint comprises sending a ratio command to the transmission which commands the transmission to operate at a particular gear ratio for a particular time based on the ratio command.

15. The method according to claim 13, wherein determining the current position of the agricultural vehicle comprises measuring an angular displacement of an output shaft of the transmission.

16. The method according to claim 12, wherein the inching controller comprises a first button and a second button, the method further comprising moving the agricultural vehicle the predetermined first distance in the forward direction each time the first button is depressed and in the reverse direction each time the second button is depressed.

17. The method according to claim 12, further comprising moving the agricultural vehicle in the forward or reverse direction based upon the second signal if the first speed based on the first signal is not zero.

18. The method according to claim 12, further comprising setting the predetermined first distance at a value based upon a user command.

19. The method according to claim 12, wherein the agricultural vehicle further comprises a display operably connected to the processor, the method further comprising determining whether the first speed based on the first signal is zero, and if the first speed based on the first signal is zero, setting a starting position of the agricultural vehicle as a first position set point and as an original position set point, the original position set point remaining unchanged until the first speed based on the first signal is more than zero, modifying the first position set point to obtain a modified position setpoint upon receipt of a second signal after the setting of the first position setpoint, the modified position setpoint having a position determined by the first position setpoint, the predetermined first distance, and the second signal, determining a current position of the agricultural vehicle and comparing the current position of the agricultural vehicle with the modified position setpoint to obtain a position set point error, moving the agricultural vehicle to the modified position setpoint to make the set point error zero; and displaying information on the display based upon a relationship between the position of the agricultural vehicle and the original set point.

20. The method according to claim 12, further comprising determining whether the inching controller is being continuously activated, and moving the agricultural vehicle in the forward or reverse direction at a predetermined second speed during a continuous activation of the inching controller.

21. The method according to claim 13, further comprising:

modifying the modified position setpoint to consecutively obtain respective consecutive additional modified position setpoints upon receipt by the processor of additional second signals from the inching controller, the additional modified position setpoints having positions determined by the first position setpoint, the predetermined first distance, the second signal, and the additional second signals, comparing an updated position of the agricultural vehicle with a last of the additional modified position setpoints each time an additional second signal is received from the inching controller, to obtain a modified position set point error, and moving the agricultural vehicle to the last of the modified position setpoints to make the modified position set point error zero.

22. The method according to claim 19, further comprising:

modifying the modified position setpoint to consecutively obtain respective consecutive additional modified position setpoints upon receipt of additional second signals by the processor from the inching controller, the consecutive additional modified position setpoints having positions determined by the first position setpoint, the predetermined first distance, the second signal, and the additional second signals, comparing an updated position of the agricultural vehicle with a last of the consecutive additional modified position setpoints each time an additional second signal is received from the inching controller to obtain a modified position set point error, and moving the agricultural vehicle to the last of the modified position setpoints to make the modified position set point error zero.

23. An agricultural vehicle, comprising:
an engine;
a continuously variable transmission operably connected to the engine;
a processor operably connected to the continuously variable transmission; and
a device for measuring the position of the vehicle operably connected to the processor;
wherein the processor is configured to:
  determine a position setpoint;
  determine a current position of the vehicle based on information received from the device for measuring the position of the vehicle;
  compare the position setpoint and the current position of the vehicle to obtain a position setpoint error indicative of the difference between the position setpoint and the current position of the vehicle; and
  control the transmission to move the vehicle from the current position towards the position setpoint to reduce the position setpoint error.

24. The agricultural vehicle according to claim 23, wherein the device for measuring the position of the vehicle is a toothed wheel sensor operably connected with an output shaft of the transmission or other shaft of the vehicle.

25. The agricultural vehicle according to claim 23, wherein the processor is configured to control the transmission to move the vehicle from the current position towards the position setpoint by continuously or intermittently determining the current position of the vehicle and comparing the current position of the vehicle with the setpoint to control the transmission to move the vehicle towards the position setpoint.

26. A method of operating the agricultural vehicle according to claim 23, comprising:
  determining a position setpoint;
  determining a current position of the vehicle based on information received from the device for measuring the position of the vehicle;
  comparing the position setpoint and the current position of the vehicle to obtain a position setpoint error indicative of the difference between the position setpoint and the current position of the vehicle; and
  moving the vehicle from the current position towards the position setpoint to reduce the position setpoint error.

27. The method according to claim 26, comprising determining a current position of the vehicle based on information received from a toothed wheel sensor operably connected with an output shaft of the transmission or other shaft in the vehicle.

28. The method according to claim 26, comprising moving the vehicle from the current position towards the position setpoint by continuously or intermittently determining the current position of the vehicle and comparing the current position of the vehicle with the setpoint to move the vehicle towards the position setpoint.

* * * * *